(12) United States Patent
Young et al.

(10) Patent No.: US 11,095,731 B2
(45) Date of Patent: *Aug. 17, 2021

(54) SYSTEM AND METHODS FOR GENERATING A SLICE DEPLOYMENT DESCRIPTION FOR A NETWORK SLICE INSTANCE

(71) Applicant: Verizon Patent and Licensing Inc., Basking Ridge, NJ (US)

(72) Inventors: Kristen Sydney Young, Morris Plains, NJ (US); Kalyani Bogineni, Hillsborough, NJ (US); Hans Raj Nahata, New Providence, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/946,087

(22) Filed: Jun. 5, 2020

(65) Prior Publication Data

US 2021/0136162 A1 May 6, 2021

Related U.S. Application Data

(63) Continuation of application No. 16/668,873, filed on Oct. 30, 2019, now Pat. No. 10,708,368.

(51) Int. Cl.
*H04M 3/16* (2006.01)
*H04L 29/08* (2006.01)
*H04W 28/24* (2009.01)
*H04L 12/24* (2006.01)
*H04W 48/14* (2009.01)

(52) U.S. Cl.
CPC .......... *H04L 67/18* (2013.01); *H04L 41/0806* (2013.01); *H04L 41/5019* (2013.01); *H04L 41/5048* (2013.01); *H04L 41/5051* (2013.01); *H04L 67/16* (2013.01); *H04W 28/24* (2013.01); *H04W 48/14* (2013.01)

(58) Field of Classification Search
CPC ..... H04W 4/022; H04W 4/029; H04W 4/023; H04W 88/02; G06K 9/6218; G06Q 10/087; H04M 1/72519; H04M 1/72522
USPC .................................. 455/414.1, 418, 422.1
See application file for complete search history.

(56) References Cited

U.S. PATENT DOCUMENTS

| 8,862,751 | B2 | 10/2014 | Faccin et al. |
| 9,325,720 | B2 | 4/2016 | Faccin et al. |
| 10,694,399 | B1 * | 6/2020 | Tran ........................ H01Q 3/20 |
| 2008/0130601 | A1 | 6/2008 | Kim et al. |

(Continued)

*Primary Examiner* — Danh C Le

(57) ABSTRACT

A slice order system may receive a request to generate a network slice configuration for providing a service via a network. The slice offer system may determine a description template associated with a network slice type. The slice offer system may determine, based on the description template and a set of deployment parameters, a description profile for the network slice configuration. The slice offer system may generate, based on the description profile and a location, a slice deployment description for the network slice configuration according to location-specific characteristics associated with resources at the location and a service level agreement associated with the request. The slice offer system may deploy the slice deployment description to permit a network slice instance to be created according to the slice deployment description.

20 Claims, 6 Drawing Sheets

(56) References Cited

U.S. PATENT DOCUMENTS

| | | | |
|---|---|---|---|
| 2011/0077000 A1 | 3/2011 | Deutsch et al. | |
| 2011/0243553 A1 | 10/2011 | Russell | |
| 2012/0031138 A1 | 2/2012 | Hunter | |
| 2013/0091212 A1 | 4/2013 | Rajakarunanayake | |
| 2015/0049602 A1 | 2/2015 | Gavita et al. | |
| 2015/0142871 A1 | 5/2015 | Tofighbakhsh et al. | |
| 2017/0289791 A1* | 10/2017 | Yoo | H04W 68/005 |
| 2018/0097911 A1 | 4/2018 | Lundgren et al. | |
| 2018/0139106 A1* | 5/2018 | Senarath | H04L 67/16 |
| 2018/0191563 A1 | 7/2018 | Farmanbar et al. | |
| 2019/0166039 A1* | 5/2019 | Wen | H04L 45/12 |
| 2019/0174322 A1* | 6/2019 | Deviprasad | H04L 43/0817 |
| 2019/0208438 A1 | 7/2019 | Yang et al. | |
| 2019/0261186 A1* | 8/2019 | Xu | H04W 16/10 |
| 2019/0281503 A1* | 9/2019 | Xu | H04L 41/50 |
| 2019/0386925 A1* | 12/2019 | Ji | H04W 28/18 |
| 2020/0137678 A1* | 4/2020 | Katsumata | H04W 48/17 |
| 2020/0163011 A1* | 5/2020 | Xu | H04L 41/0893 |
| 2020/0178085 A1* | 6/2020 | Ertimo | H04W 24/04 |
| 2020/0205176 A1* | 6/2020 | Yu | H04W 72/042 |
| 2020/0228998 A1* | 7/2020 | Bai | H04W 16/18 |
| 2020/0229080 A1* | 7/2020 | Xu | H04W 48/18 |
| 2020/0260288 A1* | 8/2020 | Yang | H04L 41/5048 |
| 2020/0313969 A1* | 10/2020 | Li | H04L 41/5051 |
| 2020/0313983 A1* | 10/2020 | Stammers | G06F 9/455 |
| 2020/0359226 A1* | 11/2020 | Xu | H04W 28/24 |
| 2020/0382374 A1* | 12/2020 | Yi | H04L 41/0893 |
| 2020/0396132 A1* | 12/2020 | Wang | H04L 41/0853 |
| 2021/0067593 A1* | 3/2021 | Habara | G06Q 30/0283 |
| 2021/0105734 A1* | 4/2021 | Xu | H04W 80/10 |

* cited by examiner

SYSTEM AND METHODS FOR GENERATING A SLICE DEPLOYMENT DESCRIPTION FOR A NETWORK SLICE INSTANCE

RELATED APPLICATION

This application is a continuation of U.S. patent application Ser. No. 16/668,873, filed Oct. 30, 2019, which is incorporated herein by reference.

BACKGROUND

5G/New Radio (5G/NR) is a next generation global wireless standard. 5G/NR provides various enhancements to wireless communications, such as flexible bandwidth allocation, improved spectral efficiency, ultra-reliable low-latency communications (URLLC), beamforming, high-frequency communication (e.g., millimeter wave (mmWave)), and/or the like.

DETAILED DESCRIPTION OF PREFERRED EMBODIMENTS

Figure 1A:
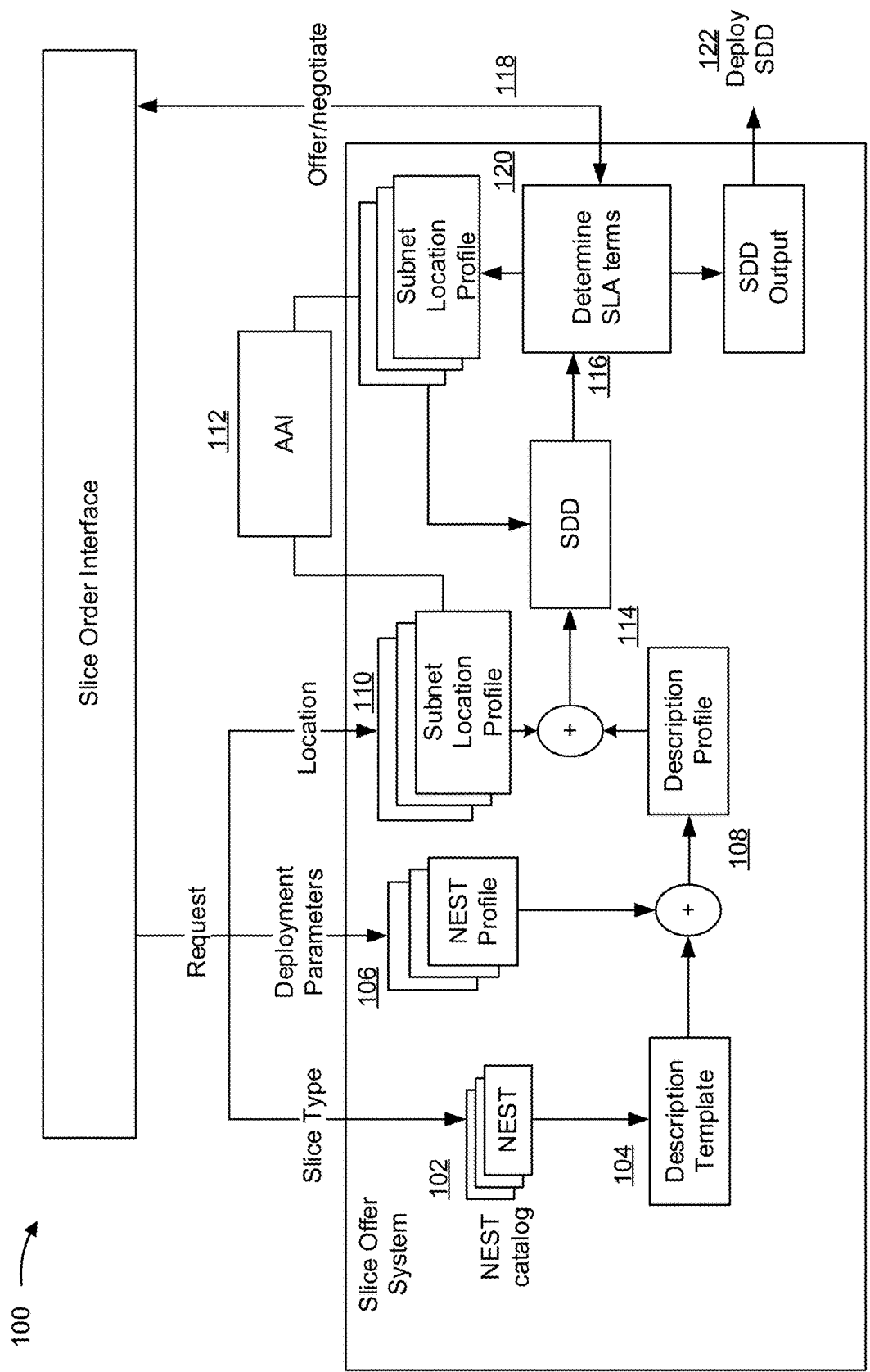
FIGS. 1A and 1B are diagrams of one or more example implementations described herein.

The following detailed description of example implementations refers to the accompanying drawings. The same reference numbers in different drawings may identify the same or similar elements.

In a wireless telecommunications system (which can be referred to herein as "the system"), such as a 5G wireless telecommunications network, network slicing allows for multiple virtual networks to run on a single physical network to support multiple services, applications, and/or entities (e.g., end users, customers, organizations that provide a service to end users of the wireless telecommunications systems, and/or the like). When a user equipment (UE) is to establish a connection (e.g., protocol data unit (PDU) connectivity) to the network for an application and/or service, the UE provides the network with information associated with the UE, the application, and/or the service. Such information (e.g., a single-network slice selection assistance information (S-NSSAI)) permits a network slice selection function (NSSF) of the system to select a network slice instance (NSI) (e.g., a virtual network of network functions (NFs) and other resources to support one or more S-NSSAIs) according to a network slice configuration associated with the S-NSSAI (e.g., a network slice configuration that can provide the service as defined by the S-NSSAI). Network slice configurations may be defined according to fixed slice descriptions of a service or slice that is to be configured to provide the service. Accordingly, if a service is to be provided with a particular set of characteristics that are not described by one of the fixed slice descriptions, the NSSF would have to configure an NSI according to a network slice configuration that is not associated with one of the fixed slice descriptions.

Some implementations described herein provide a slice offer system that permits a slice deployment description (SDD) to be generated for a network slice configuration that can be configured (e.g., as an NSI) to provide a requested service. In some implementations, the slice offer system may be configured to automatically, according to information associated with the service, determine whether an SDD for the service exists and, if not, dynamically generate a custom SDD for the service. For example, the slice offer system may receive a request to generate a network slice configuration for providing a service via a network, determine a description template associated with a network slice type of the service (e.g., identified in the request), determine a description profile for the network slice configuration (e.g., based on deployment parameters of the request), generate a slice deployment description for the network slice configuration according to location-specific characteristics associated with resources at a location (e.g., a location indicated in the request) and a service level agreement associated with the request, and/or deploy the slice deployment description to permit an NSI to be created according to the slice deployment description.

As described herein, the slice offer system may deploy the SDD to a management system of the wireless communication system. The wireless communication system may include a network slice management function (NSMF) and/or a network slice subnet management function (NSSMF) (referred to herein in combination as the "NSMF/NSSMF") and/or a network functions virtualization management and orchestration component (NFV MANO). The NSMF/NSSMF may configure the NSIs according to the SDDs, as described herein. The NFV MANO may configure NFV infrastructure (NFVI) resources according to the network slice configurations described by the SDDs, and the NSMF/NSSMF may use the SDD (e.g., in association with the NFVI resources) to create NSIs for communication sessions involving a UE.

Accordingly, some implementations described herein enable an SDD to be generated and/or defined for a network slice configuration. In this way, some implementations described herein permit automated service-based network slicing. Furthermore, because some resources of a network can be shared, end-to-end, in a wireless communication system, some resources can be dedicated to one or more customers based on a service level agreement with the one or more customers. Accordingly, some implementations described herein permit a wireless communication system to define and form (e.g., automatically to enable continuous integration/continuous delivery (CICD)) an SDD for a network slice configuration for a service, according to a request from one of the one or more customers to enable the service to be provided. According to some implementations, the wireless communication system may enable creation and/or modification of an SDD for a set of customers (e.g., a group of customers requesting a same or similar service, a group of customers requesting a same or similar terms of respective service level agreements, and/or the like). Accordingly, the wireless communication system may enable (e.g., in real-time) a corresponding SDD for the set of customers to automatically reconfigure or create an SDD (e.g., enabling CICD) for the set of customers.

Furthermore, some implementations described herein enable a slice offer system to make a deterministic selection of parameters of an SDD for a network slice configuration according to characteristics of a location for providing the service. Therefore, computing resources (e.g., processing resources and/or memory resources) associated with one or more components of a core network and/or network resources (e.g., resource blocks) associated with the core network are not wasted by over-allocating resources and/or under-allocating resources for a communication session that uses a network slice configuration defined by a created SDD as described herein. Furthermore, the slice offer system may enable a custom network slice configuration to be defined by a deployed SDD so that a UE can utilize an NSI configured for a corresponding custom service, rather than an NSI designed for another service or a more generic service (e.g., based simply on service type or other terms of a service level agreement).

Figure 1B:
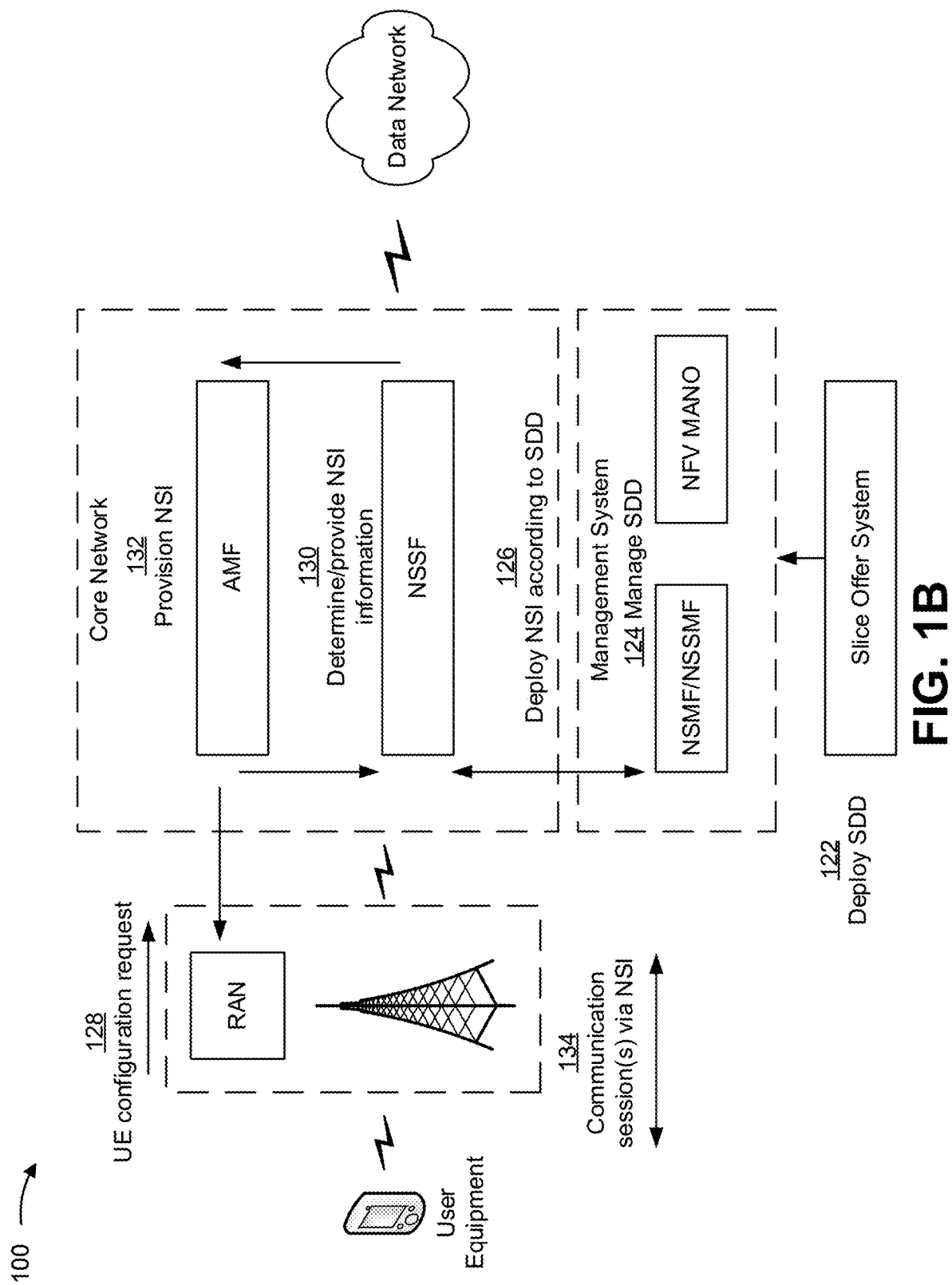

FIGS. 1A and 1B are diagrams of an example implementation 100 described herein. Example implementation 100 may be associated with a wireless communication system that includes a slice order interface and a slice offer system for determining and/or generating an SDD for a network slice configuration, as described herein. Furthermore, example implementation 100 may include a management system with an NSMF/NSSMF and an NFV MANO, a core network, a data network, a radio access network (RAN) with a base station, and a UE.

The core network of example implementation 100 can include various types of telecommunications core networks, such as a 5G next generation core network (5GC), an LTE evolved packet core (EPC), and/or the like. As shown in FIG. 1B, the core network, among other components and/or functions, can include an access and mobility management function (AMF) component and a network slice selection (NSSF) component. In some implementations, the AMF, the NSSF, and/or other components or functions, cannot be co-located or are not co-located (e.g., each component and/or function of the core network can be at a different location from each other component and/or each other function of the core network). The management system of example implementation 100 may be configured to manage the core network of the wireless communication system.

The slice order interface may correspond to a user interface of a user device configured to communicate with the slice offer system to configure or generate new SDDs for a network configuration based on a service (e.g., a custom service). Additionally, or alternatively, the slice order interface may be associated with an application programming interface (API) of a system that receives a description of a service. In some implementations, the slice order interface may provide a translation of a business level service (BLS) description (e.g., received from a user or other entity) and/or specifications of a service. For example, the slice order interface may enable a user to input BLS specifications that can be translated (e.g., by the slice offer system) into key performance indicators (KPIs) for the network to provide the BLS.

As shown, the slice order interface may provide a request that includes a slice type, deployment parameters for a service, and a location associated with where the service is to be provided by a network and/or received by UEs. In some implementations, the slice order interface and/or the slice offer system may parse the request into the slice type, the deployment parameters for the service, and/or the location. In some implementations, the slice type, the deployment parameters, and/or the location correspond to respective user inputs received by and/or provided by the slice order interface. As described herein, according to the received request, the slice offer system is to construct and describe a slice that is to be deployed, by analyzing the request, generating an SDD according to the request and/or available resources of a network, and deploying the SDD for use.

As shown in FIG. 1A, and by reference number 102, the slice offer system may identify a slice type that is indicated in a request from the slice order interface. For example, the slice type may be represented, in the request, by a network slice type (NEST) identifier (referred to herein as a "NEST"). A NEST describes a set of services the slice type is to serve via a set of service attributes that an NSI for the service is to be designed to deliver.

As shown in FIG. 1A, the slice offer system may maintain the NESTs in a template data structure (shown as the "NEST catalog"). For example, the slice offer system may store and/or map the NESTs to a plurality of corresponding description templates in a template data structure (e.g., the NEST catalog). The plurality of description templates may correspond to generic descriptions for each of the nests in the NEST catalogue. In some implementations, the description templates may be ordered and/or sorted in the catalog according to the NESTs and/or one or more characteristics of the NESTs to permit the slice offer system to identify (e.g., using an index) a description template associated with a received NEST.

In some implementations, a set of service level agreement items applicable or meaningful to a set of services may be associated with each NEST and/or a target range for each service level agreement item. Accordingly, the NEST can describe or identify a set of characteristics that a network slice configuration (or an NSI of the network slice configuration) is to have in order to support a communication session involving the service. In some implementations, such characteristics can include a service type (e.g., an enhanced mobile broadband (eMBB) service, an ultra-reliable, low-latency communications (URLLC) service, a massive Internet of Things (mIoT) service, a multi-access edge computing (MEC) service, and/or the like), a range of traffic quality of service (QoS) attributes, resources and/or NFs associated with the communication session, resource scaling policies, a set of corresponding network configurations, and/or the like.

In this way, the slice offer system may identify a NEST that is associated with a network slice type for a network slice configuration that is to provide the service.

As further shown by reference number 104, the slice offer system may select a description template based on the received NEST. For example, the NEST catalog may include corresponding description templates for the individual NESTs in the catalog. Accordingly, based on the received NEST, the slice offer system may select the description template for the service of the request.

As further shown in FIG. 1A, and by reference number 106, the slice offer system may identify deployment parameters that are indicated in the request. The deployment parameters may correspond to one or more user inputs of the request (e.g., location independent requests). For example, the deployment parameters may be represented, in the request, by a description or indication of location independent parameters (e.g., requested or potential deployment parameters of the service that do not consider an expected condition or state of the network).

As shown in example implementation 100, the slice offer system may maintain a profile catalog of NEST profiles associated with deployment parameters for respective NESTs of the NEST catalog. The NEST profiles may include and/or correspond to ranges of service availability (e.g., corresponding to a set of redundancy configuration profiles), ranges of latency requirements, one or more charge policies or models (e.g., which may be based on certain charges (e.g., transaction charges, such as payments, credits, and/or the like) for NF configurations and/or placement profiles), and/ or the like. Accordingly, the deployment parameters may indicate or identify requested terms of a service level agreement for the service (e.g., service level agreement targets).

In some implementations, the location information corresponds to a per-deployment input that enables a selection of a NEST profile from a set of NEST profiles associated with the NEST of the request. The NEST profiles may indicate resource configurations in priority order or preference order. In this way, a most preferred NEST profile may be considered by the slice order system as a top priority. For example, for a MEC slice type, a most preferred NEST profile may position a user plane function (UPF), a centralized unit user plane (CU-UP) processing, and a distributed unit (DU) as close to an edge of the network as possible (or as close to the location as possible).

As shown by reference number 108, the slice offer system may determine a description profile for the service based on the description template and the NEST profile selected according to the indicated NEST in the request. For example, values for the deployment parameters may be mapped to the NEST profiles and/or embedded into corresponding fields of the description template to create the description profile for the requested network slice configuration (and/or service).

As further shown in FIG. 1A, and by reference number 110, the slice offer system may identify location information indicated in the request. For example, the location information may identify an area and/or geolocation (e.g., corresponding to a town, a state, a country, a geographical region, and/or the like) where the service of the request is to be provided. Additionally, or alternatively, the area and/or geolocation may be associated with one or more network components and/or network devices that are to be able to establish an NSI for the service (e.g., as defined by an SDD deployed by the slice offer system, as described herein).

As shown in FIG. 1A, the slice offer system may maintain a subnet location catalog of subnet location profiles associated with locations (e.g., for corresponding cells of a network associated with the locations) that are served by the network. The subnet location profiles may include resource information associated with network resources (e.g., RAN resources, NFs, and/or the like) of the network at the location. For example, for certain locations, the resource information may indicate an availability of network resources (referred to herein as "resource availability"). Additionally, or alternatively, the resource information may include a status of network resources, a usage of the network resources, a performance measurement of the network resources, and/or the like.

As shown by reference number 112, the resource information may be received from an active and available inventory (AAI) that maintains, monitors, and/or determines resource availability of the network. For example, the AAI may provide, to the slice offer system, the resource availability for certain locations and/or resource availability according to locations served by the network. In some implementations, the resource availability maintained in the subnet location profiles is based on when an NSI is to be deployed to provide the service. For example, the slice offer system may identify a start time and end time of a service deployment from the request. In this way, the slice order system may determine resource availability for potential NSIs that could be deployed in the future for the service.

In some implementations, the AAI maintains the future resource availability (and/or usage) based on reservations (e.g., for one or more other services) and/or scheduled increases or decreases in resource availability (e.g., based on new network resources being added to the network or network resources being removed from the network). In such cases, the slice offer system, based on identifying resources according to the subnet location profile, may request the AAI to provide the resource availability for a time period of deployment (referred to herein as a "deployment period") of the service. The AAI may be configured to then maintain and/or provide resource availability (e.g., both current and future) for the network resources indicated in the subnet location profile.

As shown by reference number 114, the slice offer system of example implementation 100 may determine and/or generate an SDD based on the description profile and a subnet location profile associated with the location information. For example, resources according to the description profile may be identified according to the information provided and/or indicated in the subnet location profile for the location. The SDD may be generated to include resource information according to the description profile and the subnet location profile. For example, available resources of the subnet location profile that are configured according to the description profile may be included in the SDD. In some implementations, the SDD may be generated based on reconfiguring an existing SDD, such as an SDD that was previously configured according to the subnet location profile and/or based on the deployment parameters. In this way, an existing SDD may be reconfigured to encompass or enable a service identified in the request.

As shown by reference number 116, the slice order system may determine service level agreement terms based on the determined SDD. The service level agreement terms may be determined according to any suitable technique. For example, the slice order system may utilize a mapping of service level agreement terms to resources, resource configurations, and/or location information to determine the service level agreement terms. For example, certain resources may correspond to certain charge policies, certain performance characteristics, resource configurations, and/or the like. In some implementations, the slice order system may analyze the SDD and target service level agreement terms received from the slice order interface (e.g., provided by the user). For example, the target service level agreement terms may be received within or in association with the request for service. Accordingly, the slice offer system may verify parameters of the SDD according to transport constraints of the target service level agreement terms.

In some implementations, as shown by reference number 118, the slice order system may perform a negotiation process to offer service level agreement terms corresponding to the SDD and/or to permit a user, via the slice order interface, to indicate the target service level agreement terms. Additionally, or alternatively, as shown by reference number 120, the slice order system may determine that if determined service level agreement terms are outside of a range of target service level agreement terms, a similar iterative process can be performed using a next most preferred subnet location profile that has resources available. In such cases, the SDD may be updated according to the next subnet location profile until the determined terms are acceptable to the user and/or are within range of the indicated target service level agreement terms from the slice order interface.

As shown in FIG. 1A and FIG. 1B, and by reference number 122, when the slice order system identifies service level agreement terms that satisfy target service level agreement terms, the slice order system may deploy the SDD. For example, the SDD may be deployed to the NSMF/NSSMF which may be configured to manage the SDD using a data structure. In some implementations, the NFV MANO may be configured to monitor the NSMF/NSSMF to identify or detect new SDDs and/or reconfigured SDDs. Accordingly, the NFV MANO may coordinate with the NSMF/NSSMF to manage NFVI resources of the wireless communication system according to the SDD and/or a network slice descriptor (NSD) associated with the SDD. The deployed SDD may describe a network slice configuration by virtual network function (VNF) instances, resources of a RAN, resources of the core network, runtime information (RTI) acting on the selected packages of resources, and/or the like to produce instances and/or connectivity to make up an actual deployed NSI. The NSMF/NSSMF may then manage life cycle management (LCM) of the SDD and/or deployed NSIs associated with the SDD.

In some implementations, the slice order system may maintain a priority of NSIs that are to be deployed according to generated SDDs. In such cases, the slice order system may preempt a previously planned future deployment of an NSI according to an SDD if resources are not available according to the AAI. Additionally, or alternatively, the slice order system may maintain how many resources are needed, are used, and/or reserved by each deployment, in order to determine if a new deployment may benefit from such preemption.

As described herein, the slice order system enables configuration of an SDD using various stages. For example, the slice order system may configure template descriptions for all instances of a particular type of network slice or NEST, description profiles that are dependent on deployment parameters, and negotiable SDDs that are dependent on resource availability and/or achievable service level agreement terms. Accordingly, the slice order system, as described herein, utilizes functions that act on the different parts and stages of determining and/or generating the SDD.

As shown in FIG. 1B, and by reference number 124, the NSMF/NSSMF manages the deployed SDDs (e.g., the SDDs generated and/or provided by the slice offer system). For example, the NSMF may manage and/or maintain the SDDs in a data structure. According to some implementations, the data structure may include a mapping of S-NSSAIs and SDDs. Accordingly, when an S-NSSAI is received from a UE for a communication session, the NSSF may obtain, from the NSMF, the SDD that describes a network slice configuration for an NSI that can be deployed for the UE based on the S-NSSAI.

In some implementations, the NSMF/NSSMF may manage the SDDs in a data structure that is accessible to the slice offer system. In such cases, the slice offer system may be configured to obtain previously generated SDDs according to a request, so that a same SDD can be deployed for a subsequent request that includes the same or similar information as a previous request. Additionally, or alternatively, the NSMF/NSSMF may manage or maintain the SDDs in accordance with the NEST catalog and/or profile catalog described herein. For example, the SDDs may be provided without any RTI so that the SDDs can be deployed based on subsequently received RTI in a subsequent request.

As further shown in FIG. 1B, and by reference number 126, the NSMF/NSSMF deploys an NSI according to the SDD. For example, the NSMF/NSSMF may instantiate resources of the core network (e.g., resources indicated in FIG. 3) and/or the RAN according to the SDD that was created and/or generated by the slice offer system. Additionally, or alternatively, the NSMF/NSSMF may instantiate, using any suitable techniques, the resources based on coordinating with the NFV MANO to identify NFVI resources for the NSI. For example, an NSMF of the NSMF/NSSMF may utilize the NFV MANO to deploy the NSI in different domains via the NSSMF of the NSMF/NSSMF.

Accordingly, the NSMF/NSSMF may instantiate the resources (and/or cause one or more other components of the core network to instantiate the resources) for the NSI in association with RTI of the SDD. More specifically, the NSI may be deployed at a start time associated with the SDD and be configured to be removed or dismantled at an end time associated with the SDD. As described herein, the RTI may have been included within the request and/or indicated during a negotiation of the terms of the service level agreement.

According to some implementations, deployment of the NSI may be maintained in an NSI run-time table. The NSI run-time table may include a mapping of available NSIs for use in a communication session. Accordingly, an NSI deployed according to an SDD may be included within the run-time table in association with information from the SDD. For example, the NSI run-time table may be specific to a particular NEST of the SDD, a particular entity associated with the SDD, and/or the like. Accordingly, when a UE configuration request is received from a UE, the NSSF may refer to the NSI run-time table to identify the NSI as being associated with the UE configuration request and allocate the resources of the NSI for a communication session involving the UE, as described herein.

In this way, an NSI may be deployed according to a custom SDD generated by the slice offer system, as described herein, to permit a communication session associated with the UE to be established using the NSI.

As further shown in FIG. 1B, and by reference number 128, the UE sends a UE configuration request (e.g., a UE configuration message) (referred to herein as "the request") to the base station of the RAN to initiate a communication session between the UE and the data network and/or register the UE with the network. The UE of example implementation 100 can be a communication and/or computing device, such as a mobile phone, a smartphone, a laptop computer, a tablet computer, an Internet of Things device, and/or the like. The base station of example implementation 100 can include an access point of a RAN, such as a 5G next generation NodeB (gNodeB or gNB), an LTE evolved NodeB (eNodeB or eNB), and/or the like. In some implementations, the base station facilitates a communication session by communicating application-specific data between the UE and the core network.

As described herein, the UE configuration request received from the UE can include an S-NSSAI. The S-NSSAI can include service-based information elements that permit the core network (e.g., the NSSF) to select an NSI (e.g., the NSI deployed according to the SDD) and/or associate the S-NSSAI with an NSI for the UE. In some implementations, the S-NSSAI of the request can include a service type field, a NEST field, a service field, an entity association field, and an inter-slice priority level (ISPL) field. In some implementations, the NEST, the service, the entity association, and the ISPL are included within a slice differentiator (SD) field of the S-NSSAI. According to some implementations, the S-NSSAI can be configured such that fields of the S-NSSAI are maintained and/or identifiable by the UE, the RAN, the core network, and/or the like. As described herein, the UE may be associated with an entity that requested that an SDD be generated to permit the core network to deploy the NSI for use in a communication session involving the UE.

The service field can include a service identifier that identifies one or more services that can be involved in the communication session. For example, such services can include eMBB (e.g., for providing enhanced broadband access in dense areas, ultra-high bandwidth access in dense areas, broadband access in public transport systems, and/or the like), connected vehicles (e.g., for providing vehicle-to-everything (V2X) communications, such as vehicle-to-vehicle (V2V) communications, vehicle-to-infrastructure (V2I) communications, vehicle-to-network (V2N) communications, and vehicle-to-pedestrian (V2P) communications, and/or the like), real-time service (e.g., for providing inter-enterprise communications, intra-enterprise communications, maps for navigation, and/or the like), enhanced multi-media (e.g., for providing broadcast services, on demand and live TV, mobile TV, augmented reality (AR), virtual reality (VR), internet protocol (IP) multi-media subsystem (IMS) service, and/or the like), IoT (e.g., for providing metering, lighting management in buildings and cities, environmental monitoring, traffic control, and/or the like), URLLC (e.g., for providing process automation, automated factories, tactile interaction, emergency communications, urgent healthcare, and/or the like), mission critical push-to-talk (PTT), a fixed wireless access category (e.g., for providing localized network access and/or the like), and/or the like. In some implementations, a service type can be mapped to a same NEST. For example, IMS and Internet can both be mapped to an eMBB NEST.

The entity association field can include an entity identifier that identifies one or more entities that are associated with the service provided in the communication session. The one or more entities may correspond to one or more of the entities that requested the deployment of an SDD, as described herein. In some implementations, the one or more entities can include one or more application service providers capable of communicating with an end user associated with the UE to provide the one or more services to the end user via a communication session associated with the S-NSSAI. In some implementations, the one or more entities can be configured to monitor (e.g., via the communication session) the services at a slice level. Accordingly, different entities can be associated with different policies (e.g., according to service level agreements of the entities and/or SDDs) that permit monitoring of the services at the slice level.

The ISPL field can include a priority identifier that identifies a priority level of an NSI that is to be selected for the S-NSSAI to ensure that a priority, among network slices of the network, is given to a communication session associated with the S-NSSAI. In network slicing, traffic and services in one NSI should not impact traffic and services of another NSI. However, if resources are limited, the ISPL can indicate which S-NSSAIs are to be prioritized over other S-NSSAIs (e.g., which may be based on terms of a service level agreement described herein).

In this way, the core network can receive a UE configuration request message that includes information elements that permit the NSSF to make a service-based selection of an NSI deployed according to an SDD, as described herein.

As shown in FIG. 1B, and by reference 130, the NSSF identifies the NSI and provides NSI information according to the UE configuration request. For example, based on the S-NSSAI indicating that the UE is to use the service associated with the request from the slice order interface, the NSSF can identify and select the NSI that was deployed according to the SDD (e.g., based on the S-NSSAI of the UE configuration request) and indicate the selected NSI to the AMF. For example, the NSSF can provide an identifier, from the NSI run-time table, for an NSI that is associated with the S-NSSAI and the SDD. Additionally, or alternatively, the NSSF may indicate that the S-NSSAI has been associated with the NSI, and the AMF can use the NSI run-time table to perform one or more operations associated with the indicated NSI, as described herein. In this way, the NSSF can indicate, to the AMF, that the S-NSSAI has been associated with an NSI.

As further shown in FIG. 1B, and by reference number 132, the AMF can provision the NSI for the UE. For example, the AMF can provision the UE to use the NSI in order to enable the UE to engage in a communication session with the data network via the NSI. In some implementations, the AMF, when receiving and/or sending messages (e.g., PDUs) from and/or to the UE, can use the physical resources and/or virtual resources associated with the NSI to permit the messages to be received or sent. As shown by reference number 134, once the NSI is provisioned, the UE can engage in the communication session via the NSI.

In this way, an NSI can be configured according to a custom generated SDD to permit a UE to engage in a communication session for a service that is described by the SDD. Accordingly, as described herein, the slice offer system enables automation of construction of a fully deployable SDD, which enables fully automated NSI deployment. Accordingly, the slice offer system allows for on-demand NSI deployment, custom NSI deployment, and enhanced scalability. Accordingly, the slice offer system, as described herein, enables computing resources and/or network resources associated with services that require resource configurations that are not aligned with static or fixed SDDs and/or NSIs to be conserved, because custom SDDs and/or corresponding custom NSIs can be deployed to instantiate resources to optimally support the services to prevent loss of data, errors, and/or the like.

The number and arrangement of devices and networks shown in FIGS. 1A and 1B are provided as one or more examples. In practice, there may be additional devices and/or networks, fewer devices and/or networks, different devices and/or networks, or differently arranged devices and/or networks than those shown in FIGS. 1A and 1B. Furthermore, two or more devices shown in FIGS. 1A and 1B may be implemented within a single device, or a single device shown in FIGS. 1A and 1B may be implemented as multiple, distributed devices. Additionally, or alternatively, a set of devices (e.g., one or more devices) of example implementation 100 may perform one or more functions described as being performed by another set of devices of example implementation 100.

Figure 2:
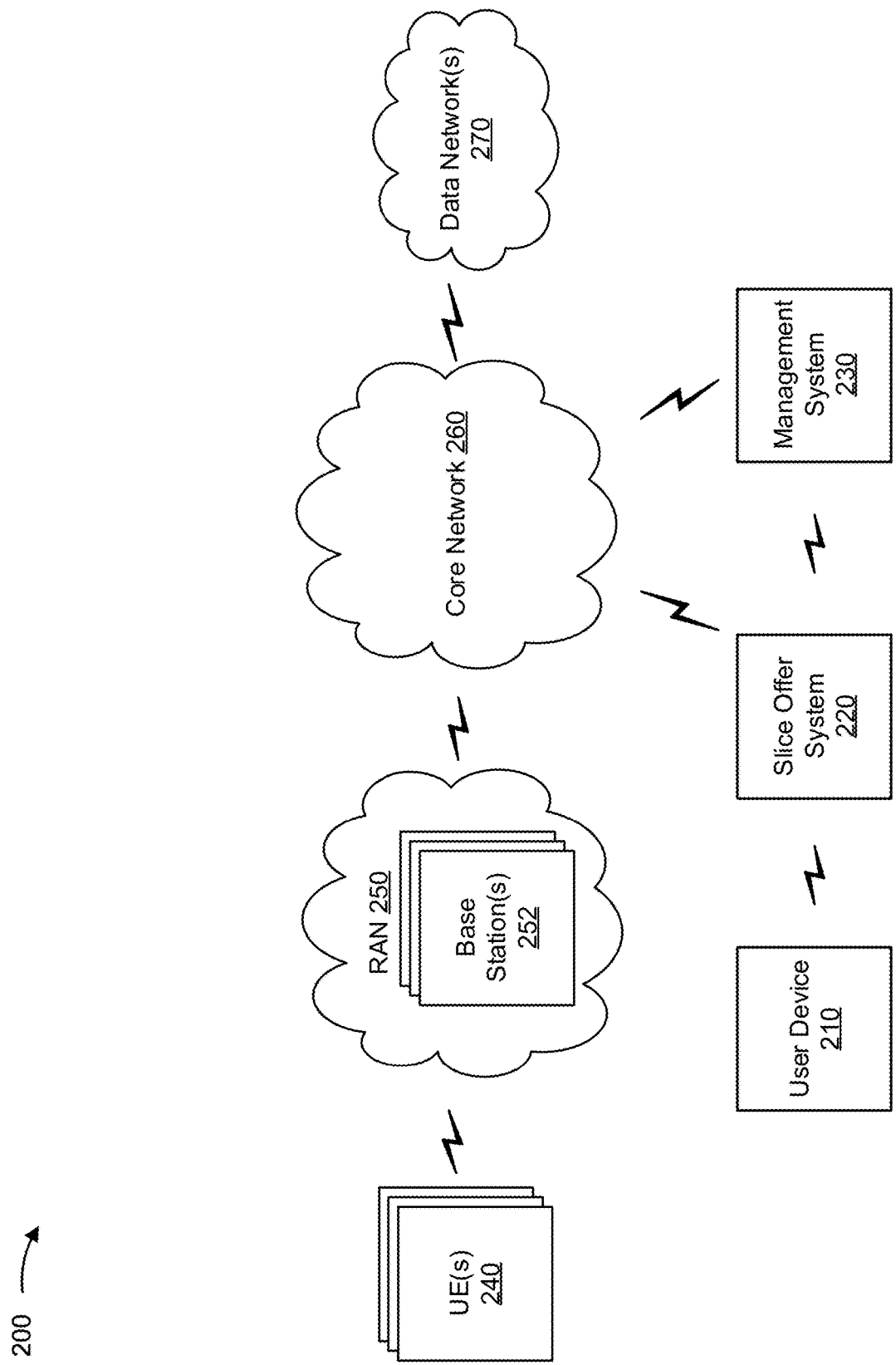
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a slice offer system 220, a management system 230, one or more UE(s) 240 (referred to herein individually as UE 240 or collectively as UEs 240), a RAN 250, one or more base stations 252 (referred to herein individually as base station 252 or collectively as base stations 252), a core network 260, and a data network 270. Devices of environment 200 may interconnect via wired connections, wireless connections, or a combination of wired and wireless connections.

User device 210 includes one or more devices capable of receiving, generating, storing, processing, and/or providing information associated with a request that an SDD be generated and/or deployed based on characteristics of a service and/or terms of a service level agreement. For example, user device 210 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device. User device 210 may include and/or be associated with the slice order interface of example implementation 100.

Slice offer system 220 includes one or more devices that are capable of receiving, storing, processing, and/or routing information associated with an SDD, as described herein. In some implementations, slice offer system 220 may include a communication interface that allows slice offer system 220 to receive information from and/or transmit information to other devices in environment 200. Slice offer system 220 may include a server device or a group of server devices. In some implementations, slice offer system 220 may be hosted in a cloud computing environment. Notably, while implementations described herein may describe slice offer system 220 as being hosted in a cloud computing environment, in some implementations, slice offer system 220 may be non-cloud-based or may be partially cloud-based.

According to some implementations, slice offer system 220 includes one or more computing resources assigned to receive a request to generate a network slice configuration for providing a service via a network, generate an SDD according to the request (e.g., which may be received from user device 210), and deploy the SDD to permit an NSI to be created according to the SDD, as described herein. As described herein, slice offer system 220 may deploy SDDs to core network 260 and/or management system 230. Slice offer system 220 may correspond to the slice offer system of example implementation 100.

Management system 230 includes one or more devices, components, or functions to manage core network 260. For example, management system 230 may include one or more devices, components, or functions for NSI deployment, NFV, NFVI resource management, SDD management, network orchestration, virtualized infrastructure management, and/or the like. In some implementations, management system 230 includes a NSMF/NSSMF and/or an NFV MANO. Additionally, or alternatively, management system 230 may maintain a VNF catalogue (e.g., of available VNFs of core network 260) and/or a network slice catalogue (e.g., an NSI run-time table and/or the like), and an SDD catalogue of SDDs for use in deploying NSIs, as described herein. Management system 230 may correspond to the management system of example implementation 100.

UE 240 includes one or more devices capable of communicating with base station 252 and/or a network (e.g., core network 260, data network 270, and/or the like). For example, UE 240 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. UE 240 may be capable of communicating using uplink (e.g., UE to base station) communications, downlink (e.g., base station to UE) communications, and/or side link (e.g., UE-to-UE) communications. In some implementations, UE 240 may include a machine-type communication (MTC) UE, such as an evolved or enhanced MTC (eMTC) UE. In some implementations, UE 240 may include an IoT UE, such as a narrowband IoT (NB-IoT) UE and/or the like. In some implementations, UE 240 may perform one or more actions described as being performed by the UE of example implementation 100.

RAN 250 can include a base station and be operatively connected, via a wired and/or wireless connection, to the core network 260 through a UPF. RAN 250 can facilitate communication sessions between UEs 240 and data network 270 by communicating application-specific data between RAN 250 and core network 260. As described herein, data network 270 can include various types of data networks, such as the Internet, a third-party services network, an operator services network, a private network, a wide area network, and/or the like.

Base station 252 includes one or more devices capable of communicating with UE 240 using a cellular Radio Access Technology (RAT). For example, base station 252 may include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, or a similar type of device. Base station 252 may transfer traffic between UE 240 (e.g., using a cellular RAT), other base stations 252 (e.g., using a wireless interface or a backhaul interface, such as a wired backhaul interface), and/or data network 270. Base station 252 may provide one or more cells that cover geographic areas. Some base stations 252 may be mobile base stations. Some base stations 252 may be capable of communicating using multiple RATs.

In some implementations, base station 252 may perform scheduling and/or resource management for UEs 240 covered by base station 252 (e.g., UEs 240 covered by a cell provided by base station 252). In some implementations, base stations 252 may be controlled or coordinated by a network controller, which may perform load balancing, network-level configuration, and/or the like. The network controller may communicate with base stations 252 via a wireless or wireline backhaul. In some implementations, base station 252 may include a network controller, a self-organizing network (SON) module or component, or a similar module or component. In other words, a base station 252 may perform network control, scheduling, and/or network management functions (e.g., for other base stations 252 and/or for uplink, downlink, and/or side link communications of UEs 240 covered by the base station 252). In some implementations, base station 252 may include a central unit and multiple distributed units. The central unit may coordinate access control and communication with regard to the multiple distributed units. The multiple distributed units may provide UEs 240 and/or other base stations 252 with access to data network 270.

Core network 260 may include various types of core network architectures, such as a 5GC (e.g., core network 300 of FIG. 3), an LTE EPC, and/or the like. In some implementations, core network 260 may be implemented on physical devices, such as gateways, mobility management entities, and/or the like. In some implementations, the hardware and/or software implementing core network 260 can be virtualized (e.g., through the use of NFV and/or software-defined networking), thereby allowing for the use of composable infrastructure when implementing core network 260. In this way, networking, storage, and compute resources can be allocated to implement the functions of core network 260 in a flexible manner as opposed to relying on dedicated hardware and software to implement these functions. Core network 260 may be managed by MANAGEMENT SYSTEM 230.

Data network 270 includes one or more wired and/or wireless data networks. For example, data network 270 can include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
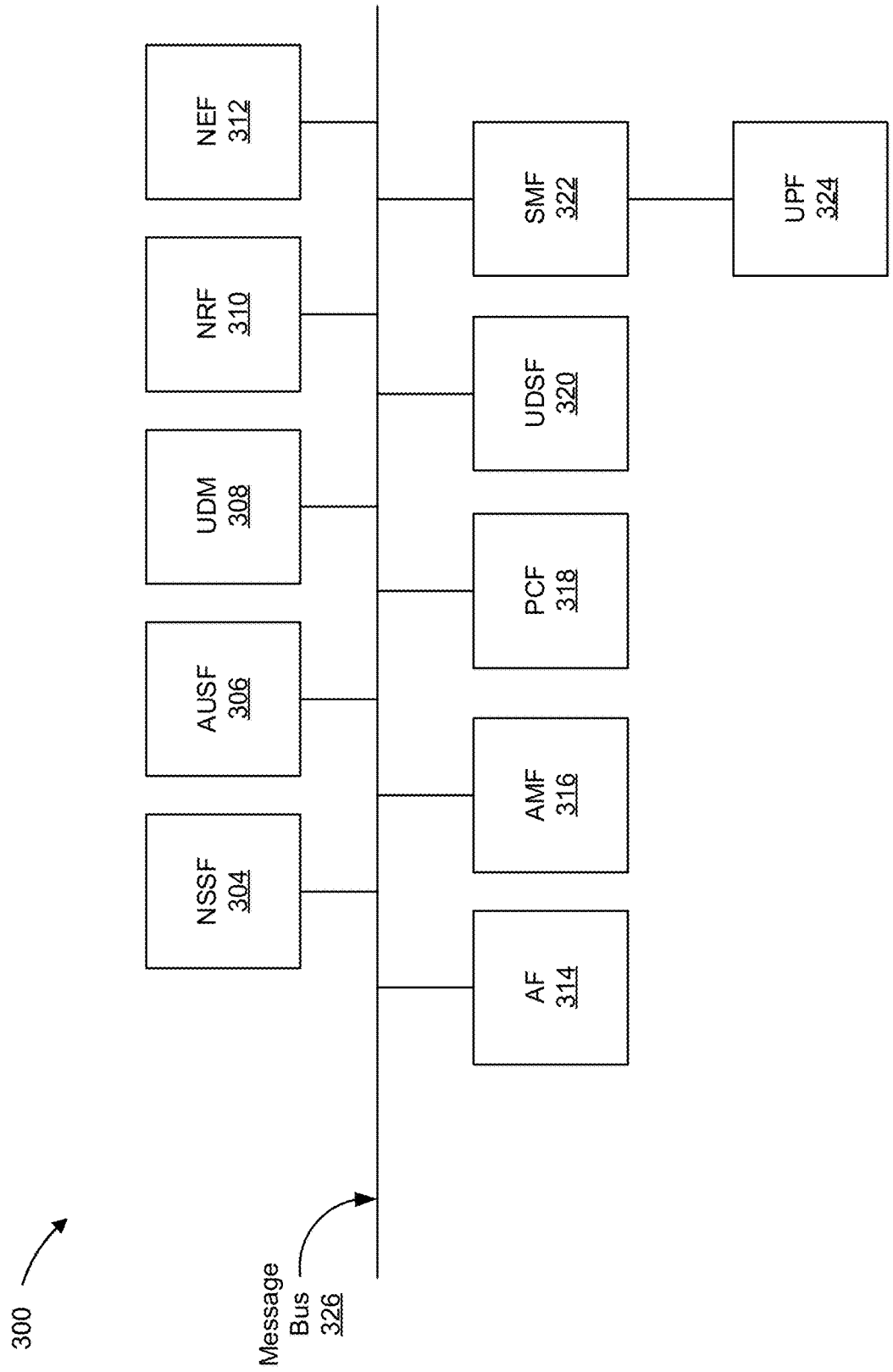
FIG. 3 is a diagram of an example functional architecture of an example core network described herein.

As shown in FIG. 3, core network 300 may include a number (or quantity) of functional elements. The functional elements of core network 300 may communicate via a message bus 302. As shown in FIG. 3, the functional elements may include, for example, an an NSSF 304, an authentication server function (AUSF) 306, a unified data management (UDM) function 308, an NF repository function (NRF) 310, a network exposure function (NEF) 312, an application function (AF) 314, an AMF 316, a policy control function (PCF) 318, an unstructured data storage function (UDSF) 320, a session management function (SMF) 322, a user plane function (UPF) 324, and/or the like. As shown, these functional elements may be communicatively connected via message bus 302.

Each of the functional elements shown in FIG. 3 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment. NSSF 304 is a hardware-based element that may select NSIs for UEs (and/or may determine network slice policies to be applied at a RAN). By providing network slicing, NSSF 304 allows an operator to deploy multiple substantially independent end-to-end networks potentially with the same infrastructure. NSSF 304 may correspond to the NSSF of example implementation 100. In some implementations, each slice may be customized for different services.

AUSF 306 is a hardware-based element that may act as an authentication server and support the process of authenticating UEs in the wireless telecommunications system. UDM 308 can store subscriber data and profiles in the wireless telecommunications system. UDM 308 can be used for fixed access, mobile access, and/or the like, in core network 260.

NRF 310 is a hardware-based element that may interface with NEF 312 to provide AMF 316 with group messages. NRF 310 may enable the functional elements of core network 300 to discover and communicate with one another via message bus 326. NEF 312 is a hardware-based element that may support the exposure of capabilities and/or events in the wireless telecommunications system to help other entities in the wireless telecommunications system discover network services. For example, NEF 312 may support the exposure of group messages that may be provided via a group messaging service.

AF 314 may be a hardware-based element that may support application influence on traffic routing, access to NEF 312, policy control, and/or the like. In some implementations, AMF 316 may be a hardware-based element that may act as a termination point for Non-Access Stratum (NAS) signaling, mobility management, and/or the like. AMF 316 can provide authentication and authorization of UEs and mobility management (e.g., provisioning UEs to use NSIs associated with SDDs as described herein). PCF 318 can provide a policy framework that incorporates network slicing, roaming, packet processing, mobility management, and/or the like.

UDSF 320 includes one or more data structures configured to store information, mappings, and/or the like associated with the core network 300. For example, UDSF 320 may include one or more tables, mappings, graphs, and/or the like of resources, NSIs, SDDs, and/or the like, as described herein.

SMF 322 may be a hardware-based element that may support the establishment, modification, and release of communication sessions in the wireless telecommunications system. For example, SMF 322 may configure traffic steering policies at UPF 324, enforce UE IP address allocation and policies, and/or the like. SMF 322 can support the establishment, modification, and release of communication sessions in the wireless telecommunications system. For example, SMF 322 can configure traffic steering policies at UPF 324, enforce UE IP address allocation and policies, and/or the like. AMF 316 and SMF 322 can act as a termination point for Non-Access Stratum (NAS) signaling, mobility management, and/or the like. SMF 322 can act as a termination point for session management related to NAS. RAN 250 can send information (e.g., the information that identifies the UE) to AMF 316 and/or SMF 322 via PCF 318.

UPF 324 is a hardware-based element that may serve as an anchor point for intra/inter-RAT mobility. UPF 324 may apply rules to packets, such as rules pertaining to packet routing, traffic reporting, handling user plane QoS, and/or the like. Message bus 326 represents a communication structure for communication among the functional elements. In other words, message bus 326 may permit communication between two or more functional elements of core network 300.

The number and arrangement of functional elements shown in FIG. 3 are provided as an example. In practice, there may be additional functional elements, fewer functional elements, different functional elements, or differently arranged functional elements than those shown in FIG. 3. Furthermore, two or more functional elements shown in FIG. 3 may be implemented within a single device, or a single functional element shown in FIG. 3 may be implemented as multiple, distributed devices. Additionally, or alternatively, a set of functional elements (e.g., one or more functional elements) of core network 300 may perform one or more functions described as being performed by another set of functional elements of core network 300.

Figure 4:
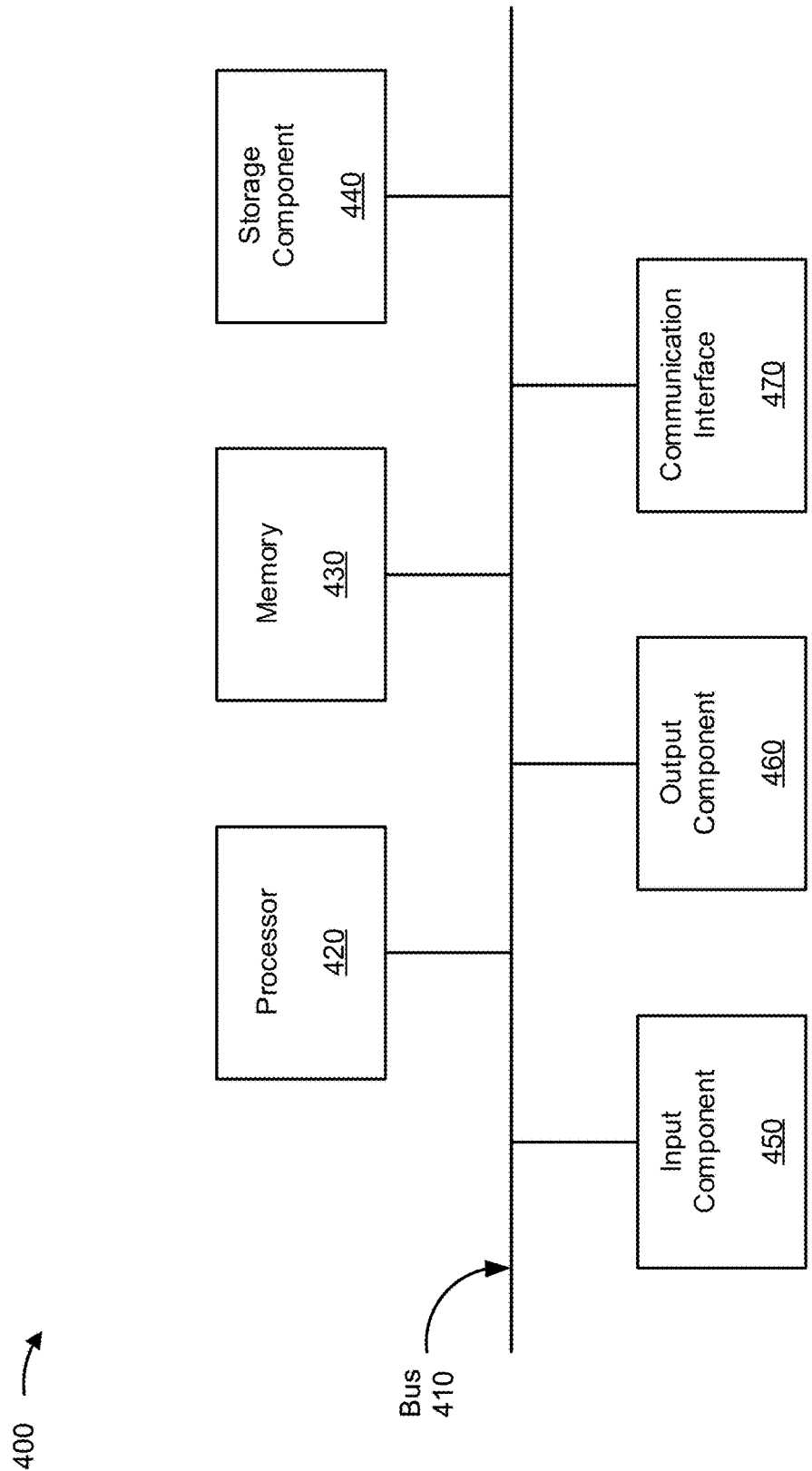
FIG. 4 is a diagram of example components of one or more devices of FIG. 2.

FIG. 4 is a diagram of example components of a device 400. Device 400 may correspond to user device 210, slice offer system 220, UE 240, base station 252, MANAGEMENT SYSTEM 230, NSSF 304, AUSF 306, UDM 308, NRF 310, NEF 312, AF 314, AMF 316, PCF 318, UDSF 320, SMF 322, and/or UPF 324. In some implementations, user device 210, slice offer system 220, UE 240, base station 252, MANAGEMENT SYSTEM 230, NSSF 304, AUSF 306, UDM 308, NRF 310, NEF 312, AF 314, AMF 316, PCF 318, UDSF 320, SMF 322, and/or UPF 324 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a wireless local area network interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
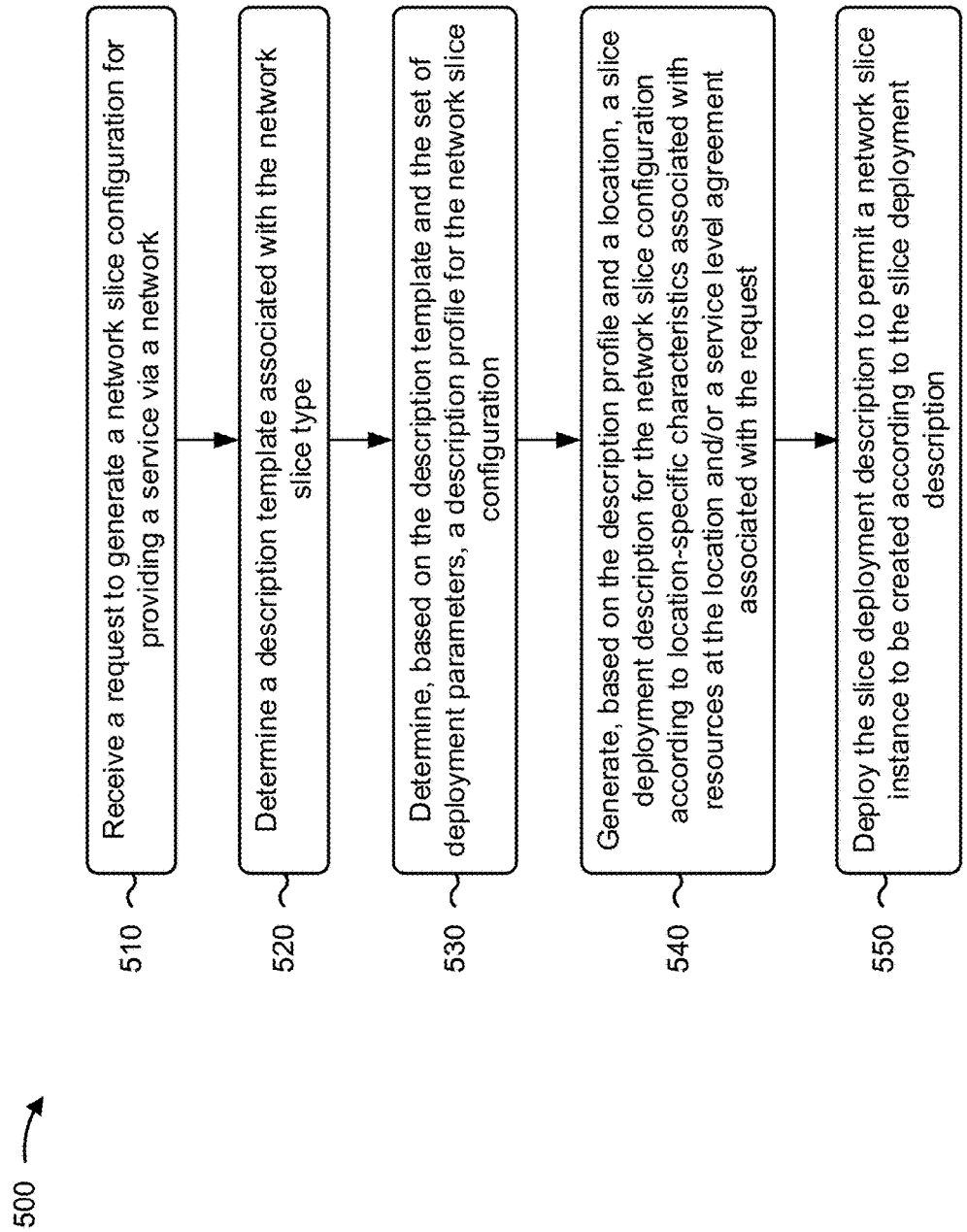
FIG. 5 is a flowchart of an example process for generating a slice deployment description for a network slice instance.

FIG. 5 is a flowchart of an example process 500 for generation of a slice deployment description for a network slice instance. In some implementations, one or more process blocks of FIG. 5 may be performed by a slice offer system (e.g., slice offer system 220). In some implementations, one or more process blocks of FIG. 5 may be performed by another device or a group of devices separate from or including the slice offer system, such as a user device (e.g., user device 210), a management system (e.g., management system 230), a UE (e.g., UE 240), a base station (e.g., base station 252), a component of a core network (e.g., one or more of the components of core network 300), and/or the like.

As shown in FIG. 5, process 500 may include receiving a request to generate a network slice configuration for providing a service via a network (block 510). For example, the slice offer system (e.g., using processor 420, memory 430, storage component 440, input component 450, output component 460, communication interface 470 and/or the like) may receive a request to generate a network slice configuration for providing a service via a network, as described above.

In some implementations, the request includes a slice type identifier that is associated with a network slice type of the network slice configuration, a set of deployment parameters for the network slice configuration, and information identifying a location associated with the service. The slice offer system may identify (and/or process the request to identify) the slice type identifier that is associated with a network slice type of the network slice configuration.

The network slice type may correspond to a service type. Additionally, or alternatively, the network slice type is associated with a set of characteristics including at least one of: a range of a quality of service attribute, a set of network functions for the NSI, a resource scaling policy associated with the NSI, or a network configuration associated with the NSI. The set of deployment parameters may include a service availability metric, a latency metric, a charge policy associated with the service, and/or the like.

According to some implementations, process 500 may include storing, in a description template data structure, a plurality of description templates associated with corresponding network slice configurations, as described above. The description templates may be stored according to network slice types of the corresponding network slice configurations.

As further shown in FIG. 5, process 500 may include determining a description template associated with the network slice type (block 520). For example, the slice offer system (e.g., using processor 420, memory 430, storage component 440, input component 450, output component 460, communication interface 470 and/or the like) may determine a description template associated with the network slice type, as described above. In some implementations, the description template is selected from the plurality of description templates.

As further shown in FIG. 5, process 500 may include determining, based on the description template and the set of deployment parameters, a description profile for the network slice configuration (block 530). For example, the slice offer system (e.g., using processor 420, memory 430, storage component 440, input component 450, output component 460, communication interface 470 and/or the like) may determine, based on the description template and the set of deployment parameters, a description profile for the network slice configuration, as described above. The description profile may be determined according to a set of deployment parameters associated with the request.

As further shown in FIG. 5, process 500 may include generating, based on the description profile and a location, a slice deployment description for the network slice configuration according to location-specific characteristics associated with resources at the location and/or a service level agreement associated with the request (block 540). For example, the slice offer system (e.g., using processor 420, memory 430, storage component 440, input component 450, output component 460, communication interface 470 and/or the like) may generate, based on the description profile and a location, a slice deployment description for the network slice configuration according to location-specific characteristics associated with resources at the location and/or a service level agreement associated with the request, as described above.

In some implementations, the service level agreement may include terms corresponding to the set of deployment parameters. Additionally, or alternatively, the location-specific characteristics may be associated with a designated time period of the service. The location specific characteristics may include an availability of a type of the resources, an available bandwidth associated with the resources, and/or the like. In some implementations, the location-specific characteristics are associated with a designated time period associated with providing the service. In some implementations, the slice offer system, based on receiving and/or determining terms of the service level agreement, may verify that the SDD satisfies the terms of the service level agreement.

As further shown in FIG. 5, process 500 may include deploying the slice deployment description to permit an NSI to be created according to the slice deployment description (block 550). For example, the slice offer system may (e.g., using processor 420, memory 430, storage component 440, input component 450, output component 460, communication interface 470 and/or the like) deploy the slice deployment description to permit an NSI to be configured according to the slice deployment description, as described above. In some implementations, the NSI is to be used in connection with enabling a communication session associated with a user equipment and the service. When deploying the slice deployment description, the slice offer system may store the slice deployment description in a data structure associated with a network function of the network that is configured to instantiate the NSI.

In some implementations, process 500 may include determining whether an NSI that is configured according to the slice deployment description may be deployed to satisfy a service level agreement associated with the set of deployment parameters and/or performing an action associated with the slice deployment description or the NSI. The NSI may be used in connection with enabling a communication session associated with a user equipment and the service.

In some implementations, when the NSI is determined to be capable of being deployed to satisfy the service level agreement, the slice offer system may configure network functions to instantiate the NSI according to the slice deployment description and/or store the slice deployment description to permit one or more other NSIs to be instantiated for one or more other services. When the NSI is determined to be incapable of being deployed to satisfy the service level agreement, the slice offer system may negotiate terms of the service level agreement based on the location-specific characteristics and adjust the slice deployment description according to the terms. Further, the slice offer system may configure network functions to instantiate the NSI according to the adjusted slice deployment description and/or store the slice deployment description to permit one or more other NSIs to be instantiated for one or more other services. Accordingly, the slice deployment description may be determined based on a negotiation of terms of the service level agreement. The negotiation of terms may be based on the location-specific characteristics and the set of deployment parameters, and/or may involve a set of communications associated with setting the terms of the service level agreement associated with an entity that provided the request.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   identifying, by a device and from a request, a slice type identifier that is associated with a network slice type of a network slice configuration;
   generating, by the device and based on information associated with the slice type identifier and a location associated with the request, a slice deployment description for the network slice configuration, according to location-specific characteristics associated with resources, to provide a service at the location;
   determining, by the device, whether a network slice instance (NSI) that is configured according to the slice deployment description may be deployed to satisfy a service level agreement associated with a set of deployment parameters; and
   deploying, by the device and when the NSI is determined to be capable of being deployed to satisfy the service level agreement, the slice deployment description to permit an NSI to be configured according to the slice deployment description.

2. The method of claim 1, wherein generating the slice deployment description comprises:
   selecting a description template based on the slice type identifier;
   determining, based on the description template, a description profile for the network slice configuration; and
   generating, based on the description profile and the location, the slice deployment description for the network slice configuration.

3. The method of claim 1, wherein the network slice type is associated with a set of characteristics including at least one of:
   a range of a quality of service attribute,
   a set of network functions for the NSI,
   a resource scaling policy associated with the NSI, or
   a network configuration associated with the NSI.

4. The method of claim 1, wherein a plurality of slice type identifiers associated with different slice types are stored in a template data structure,
   wherein the plurality of slice type identifiers are mapped to corresponding description templates in the template data structure.

5. The method of claim 1, wherein the location-specific characteristics associated with the resources include at least one of:
   an availability of a type of the resources, or
   an available bandwidth associated with the resources.

6. The method of claim 1, wherein the location-specific characteristics are associated with a designated time period associated with providing the service.

7. The method of claim 1, further comprising:
   configuring network functions to instantiate the NSI according to the slice deployment description, or
   storing the slice deployment description to permit one or more other NSIs to be instantiated for one or more other services.

8. The method of claim 1, wherein, when the NSI is determined to be incapable of being deployed to satisfy the service level agreement, the method further comprises:
   negotiating terms of the service level agreement based on the location-specific characteristics;

adjusting the slice deployment description according to the terms; and at least one of:
configuring network functions to instantiate the NSI according to the adjusted slice deployment description, or storing the adjusted slice deployment description to permit one or more other NSIs to be instantiated for one or more other services.

9. A device, comprising:
one or more processors configured to:
process a request to identify a slice type identifier that is associated with:
a network slice type of a network slice configuration, and
a location associated with a service;
determine, based on information associated with the slice type identifier, a profile for the network slice configuration;
determine, based on the profile and the location, a slice deployment description for the network slice configuration, according to location-specific characteristics associated with resources, for use in providing the service at the location;
determine that a network slice instance (NSI) that is configured according to the slice deployment description is capable of satisfying a service level agreement associated with providing the service at the location; and
perform an action associated with the slice deployment description or the NSI.

10. The device of claim 9, wherein the network slice type is associated with a set of characteristics including at least one of:
a range of a quality of service attribute,
a set of network functions for the NSI,
a resource scaling policy associated with the NSI, or
a network configuration associated with the NSI.

11. The device of claim 9, wherein the one or more processors are further configured to:
map the slice type identifier to a corresponding description template; and
determine, based on the description template, the profile for the network slice configuration.

12. The device of claim 9, wherein the location-specific characteristics associated with the resources include at least one of:
an availability of a type of the resources, or
an available bandwidth associated with the resources.

13. The device of claim 9, wherein the one or more processors, when performing the action, are configured to:
configure network functions to instantiate the NSI according to the slice deployment description, or
store the slice deployment description to permit one or more other NSIs to be instantiated for one or more other services.

14. The device of claim 9, wherein the slice deployment description is determined based on a negotiation of terms of the service level agreement,
wherein the negotiation of terms is based on the location-specific characteristics and a set of deployment parameters associated with the slice type identifier, and
wherein the negotiation of terms involves a set of communications associated with setting the terms of the service level agreement associated with an entity that provided the request.

15. A non-transitory computer-readable medium storing instructions, the instructions comprising:
one or more instructions that, when executed by one or more processors, cause the one or more processors to:
receive a request to generate a network slice configuration for providing a service via a network,
wherein the request includes:
a slice type identifier that is associated with a network slice type of the network slice configuration, and
information identifying a location associated with the service;
determine, based on the information associated with the slice type identifier, a description profile for the network slice configuration;
generate, based on the description profile and the location, a slice deployment description for the network slice configuration, according to location-specific characteristics associated with resources at the location and a service level agreement associated with the request; and
deploy the slice deployment description to permit a network slice instance (NSI) to be created according to the slice deployment description.

16. The non-transitory computer-readable medium of claim 15, wherein the NSI is to be used in connection with enabling a communication session associated with a user equipment and the service.

17. The non-transitory computer-readable medium of claim 15, wherein the network slice type corresponds to a service type.

18. The non-transitory computer-readable medium of claim 15, wherein the service level agreement includes terms corresponding to a set of deployment parameters associated with the slice type identifier.

19. The non-transitory computer-readable medium of claim 15, wherein the location-specific characteristics are associated with a designated time period of the service.

20. The non-transitory computer-readable medium of claim 15, wherein the one or more instructions that cause the one or more processors to deploy the slice deployment description, cause the one or more processors to:
store the slice deployment description in a data structure associated with a network function of the network that is configured to instantiate the NSI.

* * * * *